United States Patent [19]

Andrew et al.

[11] Patent Number: 5,428,791
[45] Date of Patent: Jun. 27, 1995

[54] CONFIGURATION MECHANISM FOR A COMPUTER SYSTEM HAVING GENERIC USER INTERFACE AND COMPONENT-SPECIFIC BUILDER MODULES

[75] Inventors: Leslie F. Andrew, Hants; Andrew J. Peters; Lucy K. Wilcox, both of Berks, all of England

[73] Assignee: International Computers Limited, London, United Kingdom

[21] Appl. No.: 314,932

[22] Filed: Sep. 29, 1994

Related U.S. Application Data

[63] Continuation of Ser. No. 74,307, Jun. 9, 1993, abandoned.

[30] Foreign Application Priority Data

Jul. 18, 1992 [GB] United Kingdom ............... 9215320

[51] Int. Cl.⁶ .................................................. G06F 13/00
[52] U.S. Cl. ................................... 395/700; 364/948.2
[58] Field of Search ............................ 395/650, 700

[56] References Cited

U.S. PATENT DOCUMENTS

| 4,809,170 | 2/1989 | Leblang et al. | 364/200 |
|-----------|--------|----------------|---------|
| 4,942,540 | 7/1990 | Black et al. | 364/514 |
| 4,951,192 | 8/1990 | Chase, Jr. et al. | 364/200 |
| 5,247,683 | 9/1993 | Holmes et al. | 395/700 |
| 5,263,164 | 11/1993 | Kannady et al. | 395/700 |

Primary Examiner—Eddie Chan
Assistant Examiner—Matthew M. Payne
Attorney, Agent, or Firm—Lee, Mann, Smith, McWilliams, Sweeney & Ohlson

[57] ABSTRACT

A configuration builder provides a common user interface for configuring a variety of different software components. The configuration builder consists of a number of component-specific builder modules and a generic user interface module. Each builder module contains templates defining user screens for inputting configuration information for a component, as well as validation rules and error messages. The configuration data for a component is obtained as set of tables, each containing records, and is then translated into the actual configuration file for use by the component.

3 Claims, 2 Drawing Sheets

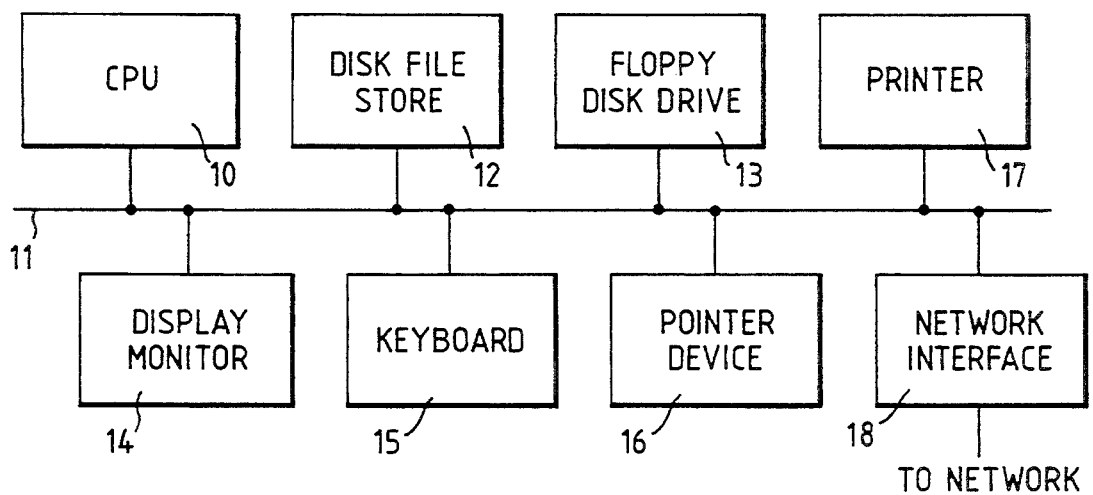
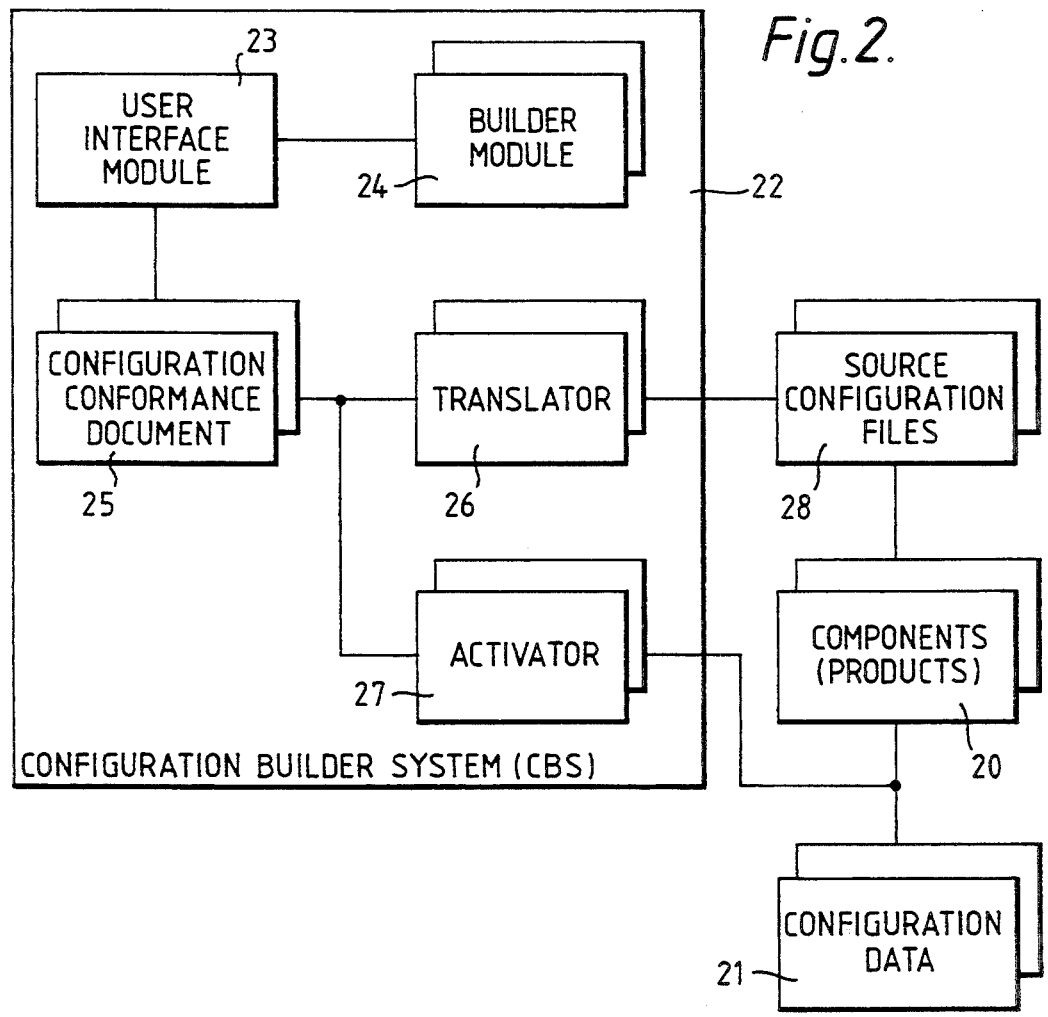

CONFIGURATION MECHANISM FOR A COMPUTER SYSTEM HAVING GENERIC USER INTERFACE AND COMPONENT-SPECIFIC BUILDER MODULES

This application is a continuation of application Ser. No. 074,307, filed Jun. 9, 1993, abandoned.

BACKGROUND TO THE INVENTION

This invention relates to a configuration mechanism for configuring a software component in a computer system.

When a new software product is obtained for a computer system, several processes must be carried out before that product is available for use. The most obvious is physical installation; products often arrive on magnetic tape or diskettes which must be copied onto local filestore before the new product is available for use. It is just as important to configure the product, ie to give the product a description of the environment it will operate in.

This description can range from the straightforward to the complex. For example, many products will ignore a mouse until they are told it is there, and can produce odd results by trying to display a colour screen on a monitor they assume is monochrome. For products that operate on a network and need to communicate with other products, extensive, accurate and consistent information about the operating environment is essential before they can be used for their intended tasks.

Configuring a product is the process of providing all this information. This process is handled differently by different products. Indeed, it often seems that no two products approach this common requirement in the same way. This variety comes about because the developers of each product create procedures and facilities without reference to one another. The user is forced to learn new and often idiosyncratic procedures for every product they configure. Important issues such as the validity and consistency of the data created by these procedures may be ignored.

The object of the present invention is to provide a configuration mechanism which overcomes or reduces these problems, so as to provide a more user-friendly method of producing a working version of a product.

SUMMARY OF THE INVENTION

According to the invention there is provided a configuration mechanism for configuring software components in a computer system, the mechanism comprising:
(a) at least one builder module, each builder module being specific to a particular component to be configured and specifying information required to be obtained to configure that component,
(b) a user interface module for selecting a builder module and performing a user interaction to obtain the information specified by that builder module, and for saving the information in a configuration conformance document, and
(c) means for using the configuration conformance document to configure the component.

It can be seen that the configuration mechanism provides a common user interface which can be used in configuring a variety of different software components. This is achieved by providing specific builder modules for each component, these modules sharing a common generic user interface module.

BRIEF DESCRIPTION OF THE DRAWINGS

FIG. 1 is a block diagram of the hardware of a computer system embodying the invention.

FIG. 2 is a schematic diagram showing software components of the computer system, including a configuration builder system.

DESCRIPTION OF AN EMBODIMENT OF THE INVENTION

Figure 3:
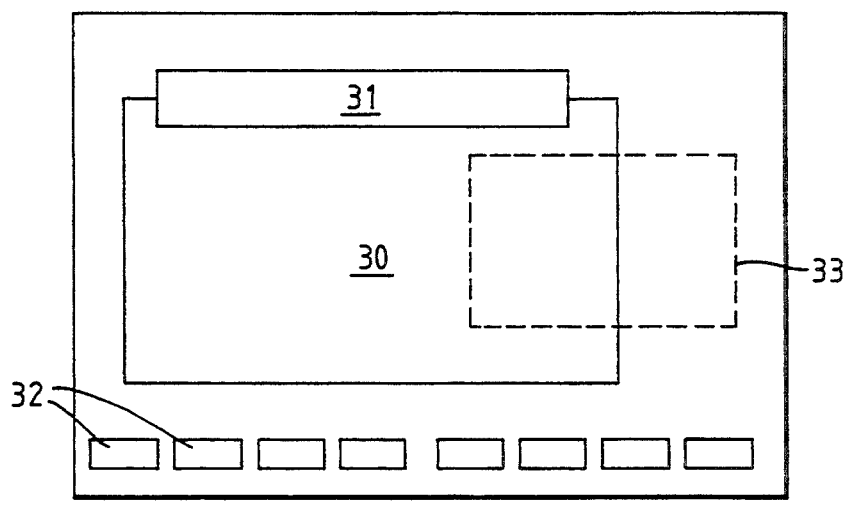
FIG. 3 shows the format of a screen display used by the configuration builder system.

One configuration mechanism for a computer system will now be described by way of example with reference to the accompanying drawings.

Referring to FIG. 1, the computer system hardware comprises a central processing unit 10 connected by way of a system bus 11 to a disk file store 12, floppy disk drive 13, VDU monitor 14, keyboard 15, pointer device 16 (eg a mouse), printer 17 and network interface 18. The interface 18 allows the computer to communicate with other computers over a network (not shown).

The computer system may, for example, be an ICL DRS 6000 computer running under the UNIX operating system. (UNIX is a registered trademark of UNIX System Laboratories Inc).

In use of the system, new software components may be installed from time to time as required. A software component may be supplied on floppy disks and installed in the system by copying it from the drive 13 into the file store 12.

When a new software component is installed, it is necessary to configure it, to provide it with information about the environment in which it is to operate. For example, a component will usually require information about the type of monitor, printer and pointer device connected to the system. The component may also require information about the other computers connected to the network, such as their identities and data transfer formats.

Referring to FIG. 2, this shows a number of software components 20 installed in the system. A software component 20 may comprise, for example, a database package, or a communications package. A component is not necessarily a complete software package: it may be part of a package. Alternatively, it may comprise a suite of related packages Each component 20 has configuration data 21 associated with it, specifying its current configuration. The configuration data may be derived by the component from a source configuration file 28 for that component. The configuration of the components is performed by means of a configuration mechanism, referred to herein as the configuration builder system (CBS) 22.

The CBS 22 comprises a user interface module 23 and one or more builder modules 24. Each builder module 24 is specific to a particular component 20, and is supplied with that component. Before a component can be configured, the builder module 24 for that component must first be installed in the CBS. The user interface module 23 is generic (ie not specific to any component) and is shared by all the builder modules.

The user interface 23 allows a user to enter configuration data to define a new configuration or to update an existing configuration. The configuration data is stored in files referred to as configuration conformance documents (CCDs) 25. Each CCD contains configuration data relating to a particular configuration version for component. There may be more than one CCD for each instance of a component: for example, one CCD may hold the current operational configuration while another CCD may hold a configuration that is planned but not yet implemented.

The CCDs are binary files, and are structured in a machine—independent format. Each CCD comprises a set of one or more tables, each table comprising a number of records and each record comprising a number of fields. The structure of these tables reflects the data model of the component to which the CCD relates.

Each builder module 24 comprises a set of templates, validation rules and messages. The templates define a set of component-specific screens which are presented to the user by the interface 23 to allow the user to enter configuration information for the component. The rules are used to validate the data entered by the user eg to check that the data conforms to the data model of the component. The messages include error messages and help messages for displaying to the user.

Each builder module 24 may have either a translator 26 or an activator 27 associated with it. A translator 26 is a component-specific program which, when run, converts a valid CCD into a component-specific configuration file 28. An activator 27 is a component-specific program which, when run, directly accesses the configuration data 21 of component so as to directly alter the configuration of the component.

Referring now to FIG. 3, this shows the general format of the screen displays produced by the user interface module 23. Each screen display comprises a work area 30 which may be used for example to display a menu or form. In the case of a menu, the user may select an option from the menu by positioning a cursor to highlight the option. In the case of a form, the user may enter data or edit the contents of the form by normal keyboard operations. A title area 31 displays a message describing the contents of the work area 30.

At the foot of the screen, eight highlighted boxes 32 are displayed. These represent the first eight function keys of the keyboard (usually labelled F1–F8). If any of these boxes contains text, then pressing the corresponding function key will initiate a function indicated by the text. If the box is blank, then the corresponding function key will have no effect.

In any screen, one of these function boxes 32 is labelled HELP. Pressing the corresponding function key causes a context-sensitive help message to be displayed as a pop-up frame 33. The pop-up frame can be removed by pressing another function key, indicated by a function box labelled ESCAPE.

Figure 4:
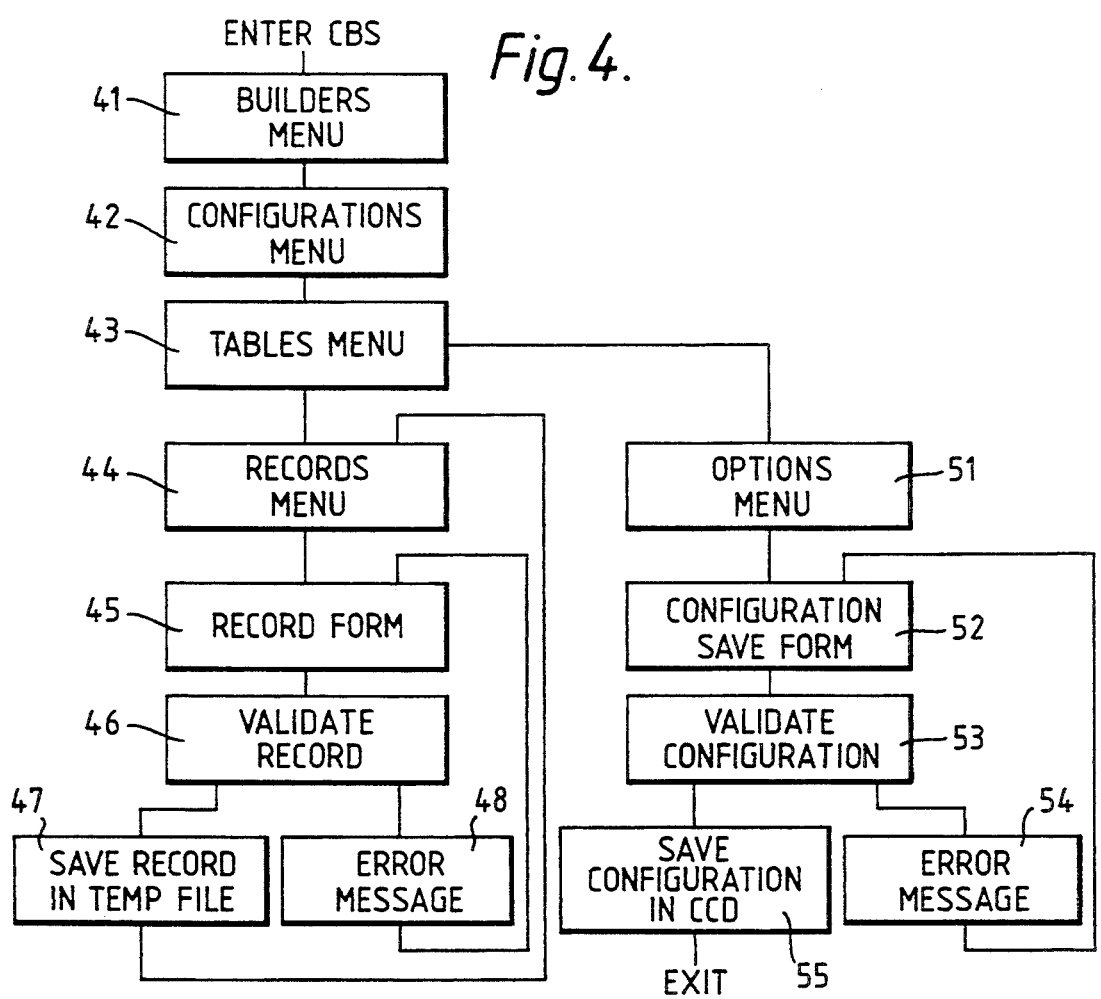
FIG. 4 is a flow diagram showing the operation of the configuration builder system.

The operation of the user interface 23 will now be described in detail with reference to FIG. 4.

(41) Initially, upon entry to the CBS, a builders menu is displayed. This is a list of builder modules that have been installed in the CBS and are available to the user. The following function keys are defined in this state:

ENTER—select one of the builders from the menu.
EXIT—exit from the CBS.

(42) If a builder is selected in step (41), a configurations menu is now displayed. This is a list of all existing configurations that have been generated using the selected builder. The following function keys are defined in this state:

ENTER—select one of the configurations from the menu

CREATE—create a new configuration. The new configuration contains tables as defined by the templates in the builder, but initially these tables are all empty ie contain no records.

DELETE—delete one of the configurations from the menu.

ESCAPE—return to the builders menu.

(43) If at step 42 above a configuration was selected or a new configuration was created, a tables menu is displayed. This is a list of the tables defining the configuration. The following function keys are defined in this state:

ENTER—select one of the tables from the menu for editing.

OPTIONS—display a pop-up options menu (see step 51 below).

ESCAPE—return to the builders menu.

(44) If a table was selected, a records menu is now displayed. This is a list of the records in the selected table. For each record, a record identifier number and name are displayed. The following function keys are defined in this state:

ENTER—select one of the records from the menu for editing.

APPEND—create a new blank record.

COPY—create a new record as a copy of an existing record.

DELETE—delete an existing record.

ESCAPE—return to the tables menu.

(45) If a record was created or selected, a record form is displayed, showing all the information in the fields of the record. The fields can then be edited on the screen, as desired, by normal keyboard operations. The following function keys are defined in this state:

COMPLETE—data entry is complete for this record.

NAVIGATE—turn on a navigator facility (see below).

ESCAPE—return to the records menu.

(46) When the COMPLETE function key is pressed, a check is performed on the information entered on the screen.

(47) If all the fields on the screen contain valid values, they are written to a temporary work file and the message "update successful" is displayed on the screen. If the navigation facility is off, it is assumed that, once a record is filled in and completed, the next task will be to create another record in the same table. In this case, therefore, the same records menu is restored, with the new record (if any) added to it. If, on the other hand, the navigation facility is on, the system recognises any relationships that have been defined between the record just entered and records in other tables; and prompts the user with a list of those tables. The user may then select these other tables to enter records necessary to complete the relationship. This facility makes it easier for the user to produce an error-free configuration.

(48) If, on the other hand, the check is unsuccessful, a pop-up frame is displayed, containing an error message indicating the cause of the failure. The error message is removed when the ESCAPE function key is pressed, allowing the record to be corrected.

(51) The pop-up options menu mentioned above contains the following options which can be selected by the user.

VALIDATE/SAVE—perform a check on the configuration and, if successful, save it.

VALIDATE—perform a check on the configuration without saving it.

FORCE-SAVE—save the configuration without checking it. This option is useful if it is desired to store a partially completed configuration.

The following function keys are specified in this state:
ENTER—select an option.
ESCAPE—return to the builder menu.

(52) If the VALIDATE/SAVE option was selected, a configuration save form is now displayed. This form contains the following fields:

Save in file—the name of the CCD file in which the configuration informations is to be stored.

Directory—the location that the CCD file will be stored in. This is for information only and cannot be changed by the user.

Configuration name—a user-specified name for the configuration. This can be different from the CCD file name.

The following function keys are defined for this state:
SAVE—perform the selected action (in this case, validate and save the configuration).
ESCAPE—return to the builder menu without validating or saving the configuration.

(53) When the SAVE key is pressed, the configuration is checked, using the validation rules in the builder module.

(54) If the configuration does not satisfy the validation rules, a validation error message is displayed as a pop-up form. Pressing an ESCAPE function key removes this message and returns to the configuration save form.

(55) If, on the other hand, the configuration satisfies all the validation rules, the configuration is saved from the temporary work file to the specified CCD file, and the CCD file is marked as valid.

The translation or activation program 26, 27 may then be run, so as to configure the component 20 in accordance with the information in the CCD.

If the VALIDATION option was selected from the options menu (step 51) the operation is similar to that described above, except that the configuration is not saved. If the FORCE-SAVE option was selected, the configuration is saved without validation, and the CCD is marked as invalid. The translation and activation programs 26 will not operate on a CCD that is marked as invalid.

In the above example, configurations for a computer are managed locally by setting up a CBS on that computer and using it to generate the configurations for that computer. Alternatively, configurations for a group of computers may be managed centrally by setting up a CBS in one computer.

Configurations for all the computers in the group can then be created by the single CBS and the resulting CCDs or configuration files then transferred to the relevant computers in the group, using a networking facility.

It will be appreciated that many modifications may be made to the system described above without departing from the scope of the invention. For example, instead of the style of interface depicted in FIG. 3, other interface styles may be used.

What is claimed is:

1. A computer system comprising:
    (a) a plurality of software components;
    (b) a plurality of builder modules, each said builder module specifying information required to be obtained for configuring a respective one of said software components;
    (c) a user interface module, common to and shared by all of said builder modules, said user interface module comprising means for using a selected one of said builder modules to control a user interaction to obtain configuration information for configuring a selected one of said software components, and means for writing said configuration information into a configuration conformance document comprising a plurality of records, each of said records comprising a plurality of fields; and
    (d) translator means for converting said configuration conformance document into a component-specific configuration file;
    (e) configuration means for configuring said selected one of said software components according to said component-specific configuration file.

2. A computer system according to claim 1 wherein each of said builder modules comprises a set of templates for defining a set of component-specific screens, and wherein said user interface module comprises means for displaying said component-specific screens, and means for allowing a user to enter said configuration information in said screens.

3. A computer system according to claim 2 wherein each of said builder modules further comprises a set of validation rules, and wherein said user interface module further comprises means for using said validation rules to validate said configuration data after entry by said user.

* * * * *